(12) United States Patent
Felton (10) Patent No.: US 12,336,466 B2
(45) Date of Patent: Jun. 24, 2025

(54) VEGETATIVE ROOFING AND SIDING SHINGLES

(71) Applicant: Colin Christopher Felton, Coos Bay, OR (US)

(72) Inventor: Colin Christopher Felton, Coos Bay, OR (US)

( * ) Notice: Subject to any disclaimer, the term of this patent is extended or adjusted under 35 U.S.C. 154(b) by 0 days.

(21) Appl. No.: 17/435,692

(22) PCT Filed: Apr. 27, 2020

(86) PCT No.: PCT/US2020/030146
§ 371 (c)(1),
(2) Date: Sep. 1, 2021

(87) PCT Pub. No.: WO2020/223173
PCT Pub. Date: Nov. 5, 2020

(65) Prior Publication Data
US 2022/0167564 A1      Jun. 2, 2022

Related U.S. Application Data (60) Provisional application No. 62/840,185, filed on Apr. 29, 2019, provisional application No. 62/845,779, filed on May 9, 2019, provisional application No. 62/889,583, filed on Aug. 21, 2019.

(51) Int. Cl.
*A01G 9/033* (2018.01)
*E04D 1/30* (2006.01)

(52) U.S. Cl.
CPC ............... *A01G 9/033* (2018.02); *E04D 1/30* (2013.01); *E04D 2001/308* (2013.01)

(58) Field of Classification Search
CPC .......... A01G 9/02; A01G 9/021; A01G 9/033; E04D 1/30; E04D 2001/308; E04D 11/00; E04D 1/12; E04D 1/26
See application file for complete search history.

(56) References Cited

U.S. PATENT DOCUMENTS

| | | | | |
|---|---|---|---|---|
| 7,997,027 | B1 * | 8/2011 | Mischo | E04D 11/002 47/65.5 |
| 2013/0055673 | A1 * | 3/2013 | Meuser | E04D 11/002 47/65.5 |
| 2013/0333285 | A1 * | 12/2013 | Buist | A01G 9/027 47/65.9 |
| 2016/0135381 | A1 * | 5/2016 | Garner | A01G 9/033 47/65.9 |

FOREIGN PATENT DOCUMENTS

DE      19747440 C1 *   7/1999    .............. E04D 1/30

\* cited by examiner

*Primary Examiner* — Beth A Stephan
(74) *Attorney, Agent, or Firm* — Mohr Intellectual Property Law Solutions (57) ABSTRACT

Embodiments relate to an enhanced method for installing vegetation on sloped roofs or walls by incorporating waterproofing and support for vegetation in the same shingle avoiding the need for a separate waterproofing membrane. The design is for a roofing shingle that can be made out of any water resistant plastic, plastic composite, metal or material with a reasonably low coefficient of thermal expansion. The shingle has an exposure that has a box for supporting drainage media, soil and vegetation and installs in a traditional method with a nail gun and with the normal head-lap for weatherproofing.

16 Claims, 10 Drawing Sheets

VEGETATIVE ROOFING AND SIDING SHINGLES

BACKGROUND

Field of the Invention

The present invention relates in general to an enhanced method for installing vegetation on sloped roofs and in particular to roofing shingles that support drainage media, soil and vegetation and eliminate the need for a separate waterproofing membrane. These shingles install like normal shingles with headlap, nailing strip and exposure.

Description of the Related Art

Existing systems for installing green or vegetative roofing systems are primarily for flat or slightly inclined roofs. Typically a flat roof deck is required and a durable elastomeric membrane is first applied over the roof surface. The membrane provides all of the waterproofing required and is also used to prevent root penetration into the roof deck. Either boxes with drainage on the bottom or a permeable grid system is laid on top of the membrane is used to support drainage media, soil and vegetation and prevent erosion. A non-woven or woven water permeable membrane is used between the soil and drainage media to prevent soil and roots from obstructing the drainage media.

The grids or boxes are not normally fastened to the roof through the membrane. On purely flat roofs the grids or boxes are interconnected but free-floating and held down by their own weight. On sloped roofs the grids or boxes are prevented from sliding off the roof by some sort of retaining boards or brackets at the lower edge and side edges of the roof.

With the current technologies skilled laborers are necessary to install and seal the membrane joints. In addition, heavy equipment is normally required to place the soil onto the roof and move large rolls or large mats of vegetation on top of the soil/grid system. The requirement for skilled labor and heavy equipment to install a green roof typically precludes homeowners or normal roofers from installing green roofs.

There are many patents that relate to drainage systems, interlocking grid and modular box systems for green roof and siding applications (e.g. U.S. Pat. No. 6,862,842B2, US20100126066A1, US20050229535A1). The major distinction between current technologies and the present invention, however, is that the waterproofing system and the vegetation support are integrated in a single shingle. Also, the present invention is only intended for sloped roofs or walls and will not adequately shed water for flat or slightly inclined roofs.

PCT/US18/53575 discloses a green roofing panel that installs like roofing shingles or shakes however in this invention the panels overlap with drainage only at the lower face and not underneath the soil. Furthermore, the bottom of the headlap is elevated to be level with the top of the vegetation in the exposure resulting in an installation with a stepped or staggered appearance as well as water flow directed over the top of the vegetation. In the current invention the bottom of the headlap and exposure are on the same plane resulting in an installation with vegetation that has an even appearance and water draining from shingles installed above flows directly underneath the soil and vegetation.

The referenced current solutions that exist in the marketplace today, have difficult and time-consuming procedures for constructing green roofs. They are labor-intensive to install and require skilled, expensive installers and heavy equipment to efficiently put waterproofing, drainage mechanisms, soil and vegetation on the roof.

None of the previous inventions and patents, taken either singly or in combination, is seen to describe the invention as claimed herein. Hence, the inventor of the present invention proposes to resolve and surmount existent technical difficulties to eliminate the aforementioned shortcomings of prior art.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terms "headlap", "course", "exposure" and "nailing strip" have the same meanings used for traditional roofing and siding shingles and their installation. The term "width" is intended to mean a dimension in the direction of a course of shingles. The term "thickness" is intended to mean a dimension orthogonal to the surface of the roof or siding. The term "height" is intended to mean measurements in the direction parallel to the installation surface and orthogonal to the direction of a course of shingles. The use of the terms "above" is intended to mean the direction towards the peak of a roof or top of a wall and parallel to the shingle installation surface. The term "below" is intended to mean in the direction towards the ground and parallel to the shingle installation surface. The term "upper" is used to describe a shingle feature closest to the peak of the roof and "lower" is used to describe a shingle feature closest to the ground. The term "bottom" is used for the base plane of the exposure adjoining the installation surface. The term 'green' is used to mean containing or supporting vegetation.

The composition percentages referenced in this patent are all weight percent (%). Wood fiber is understood to be from trees such as pine, fir, bamboo etc. and not annual growth plants. The wood fiber referenced in this patent can be that recovered from pulp mill wastewater and contain adhered contaminants such as Calcium Carbonate.

The present invention is intended to provide a methodology for reducing the labor cost associated with installing vegetated green roofs. The design is for a roofing shingle that can be made out of any water resistant plastic, plastic composite, metal or material with a reasonably low coefficient of thermal expansion. The shingle installs like traditional roofing shingles with a nail gun and with the normal headlap for weatherproofing but has an exposure that supports drainage media, soil and vegetation and helps prevent soil erosion even on significantly inclined roofs.

The dimensions of the shingle as per its preferred embodiments have a similar exposure and headlap of commercially available roofing shakes however with the width of the headlap the same as commercial gardening flats. The width and height can be any manufacturable dimension. However for adequate water shedding ability the headlap should be taller than the exposure. In addition, the dimensions of a shingle with soil and vegetation should ideally be lightweight and not bulky so it can be easy to handle by a single person and not require large machines for transport and handling. A typical gardening flat is approximately 250 mm high×500 mm wide and with a thickness of about 50 mm. With these exposure dimensions, the headlap should be approximately 300 mm in height with a nail-strip height of 50 mm.

Figure 1:
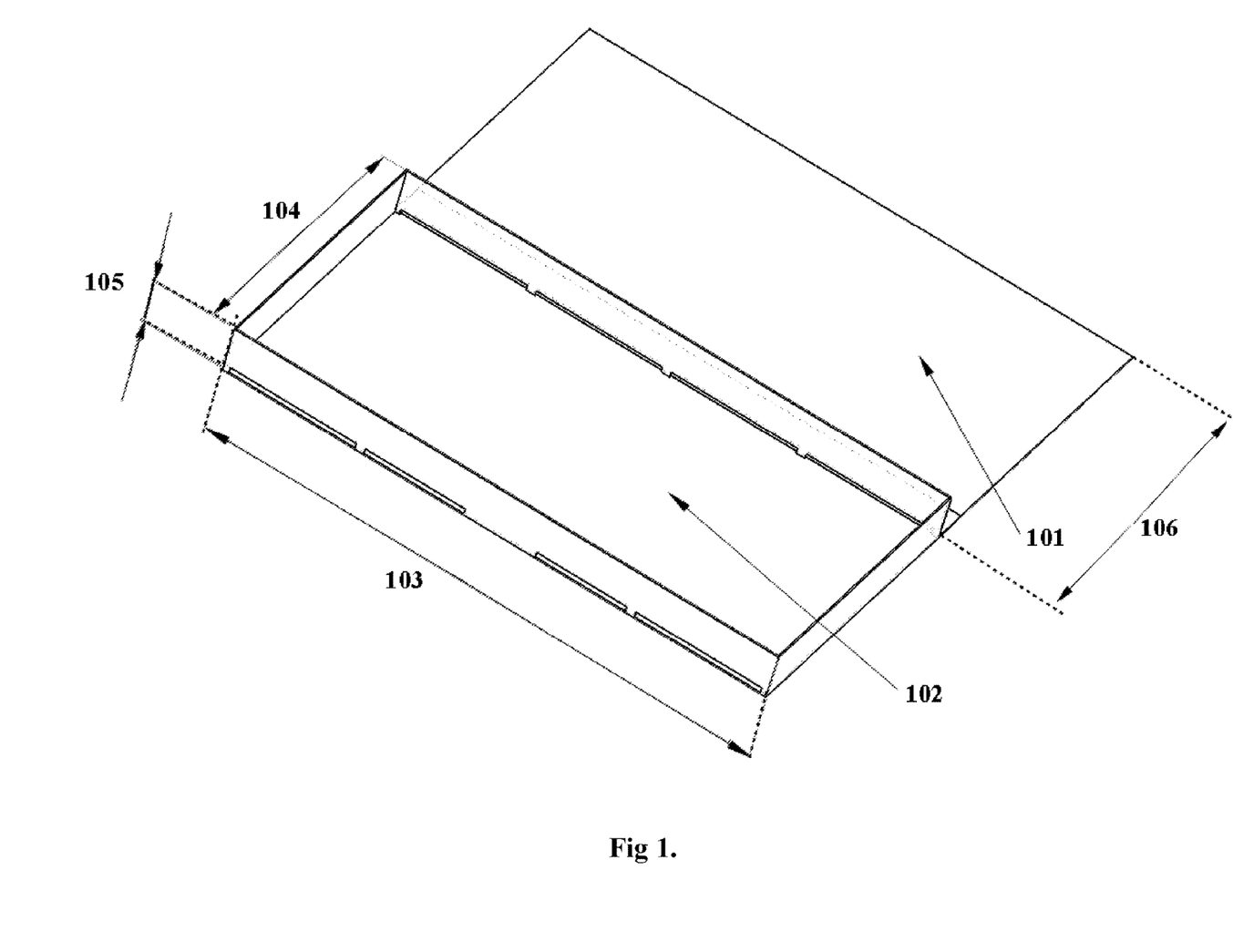
FIG. 1 discloses the appearance of a green roof shingle as per illustrative embodiments of the invention.

FIG. 1 shows a single shingle with headlap (101) and exposure (102) that has a width (103), exposure height (104), headlap height (106), and thickness (105) of the exposure box for supporting drainage media, soil and vegetation. The cavity on a single shingle typically has four walls for soil, drainage media and vegetation retention but can also consist of a plurality of smaller cavities that in sum add up to the dimension of the exposure.

Figure 2:
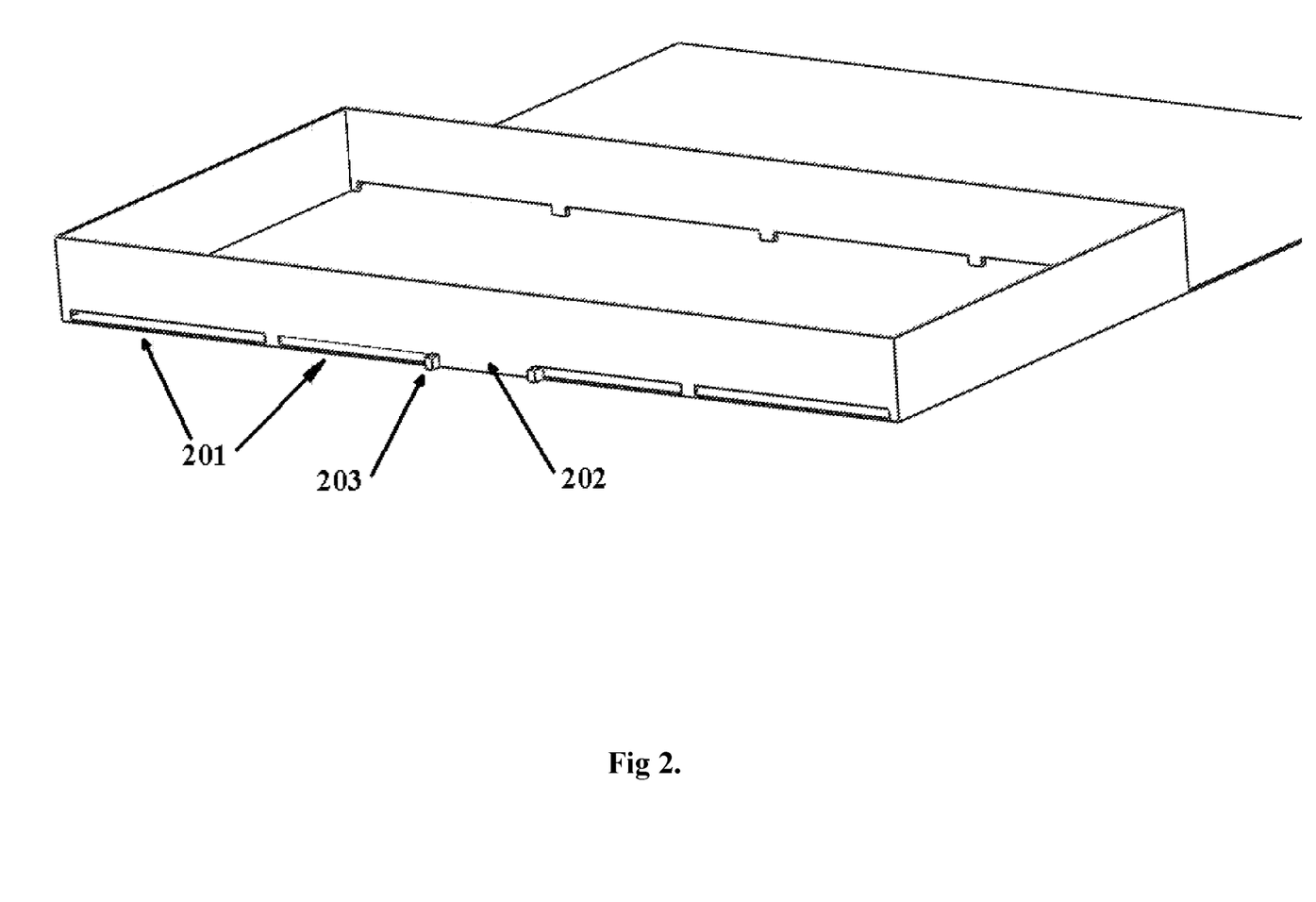
FIG. 2 discloses the configuration of the lower drainage areas of a green roof shingle as per illustrative embodiments of the invention.

The shingle in the present invention has open drainage areas (201) at the bottom of the lower face of the exposure box to allow water flow from the shingles installed above through to the shingle installed below. The thickness of the drainage area is sufficient to allow movement of the water that is draining from all of the shingles installed above. Typically this area is only a small fraction of the thickness of the exposure. The drainage area on the bottom of the lower face of the exposure box should also have an area that is occluded from drainage (202) and that should align with the joint between the two adjoining shingles installed below it. This occluded area aligns with the joint between two adjoining shingles installed below. To prevent lateral movement of water there can be protrusions (203) on the bottom of the lower face of the exposure to direct the water to the shingle below it.

Figure 3:
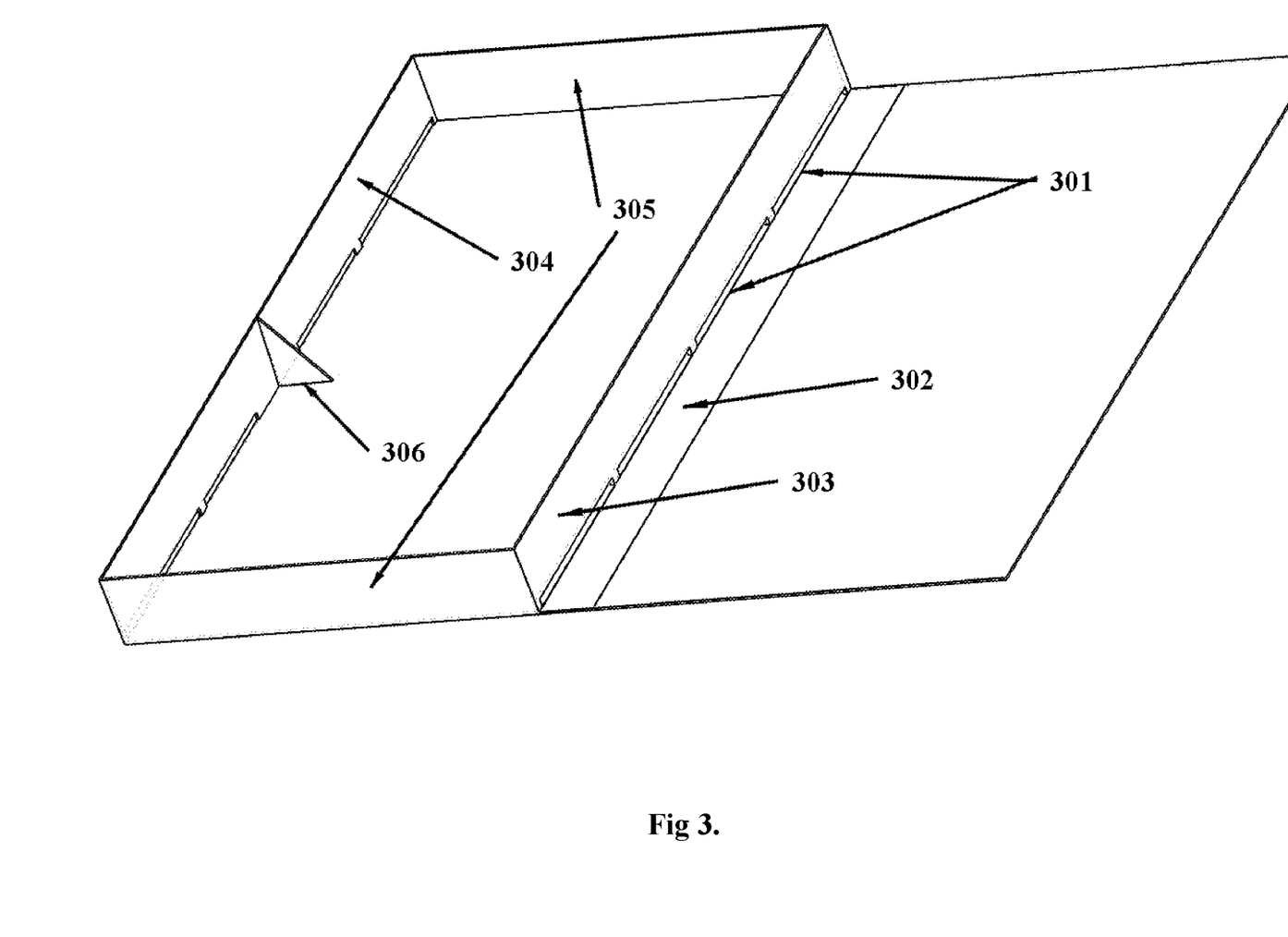
FIG. 3 discloses the configuration of the upper drainage areas of a green roof shingle as per illustrative embodiments of the invention.

There are drainage areas (301) on the top face of the exposure box (303) that receive water from the lower face of the shingle above it however there is no need for any occluded area. Above the top face of the exposure there is the nailing area (302) where the shingles are fastened to the roof deck with nails or screws and with the nails passing through the top of the exposure of the shingle below it.

The top face (303) or lower face (304) of the exposure box can also be perforated or have any combination of holes or slits to save on material cost and weight if necessary however the sides of the exposure box (305) should be impermeable to prevent lateral movement of water. There may be gussets (306) on the inside faces of the exposure box for structural support as needed. In addition to gussets, the exposure may have ribs, a grid or protrusions from the bottom of the headlap to further inhibit erosion on steeply sloped roofs.

Figure 4:
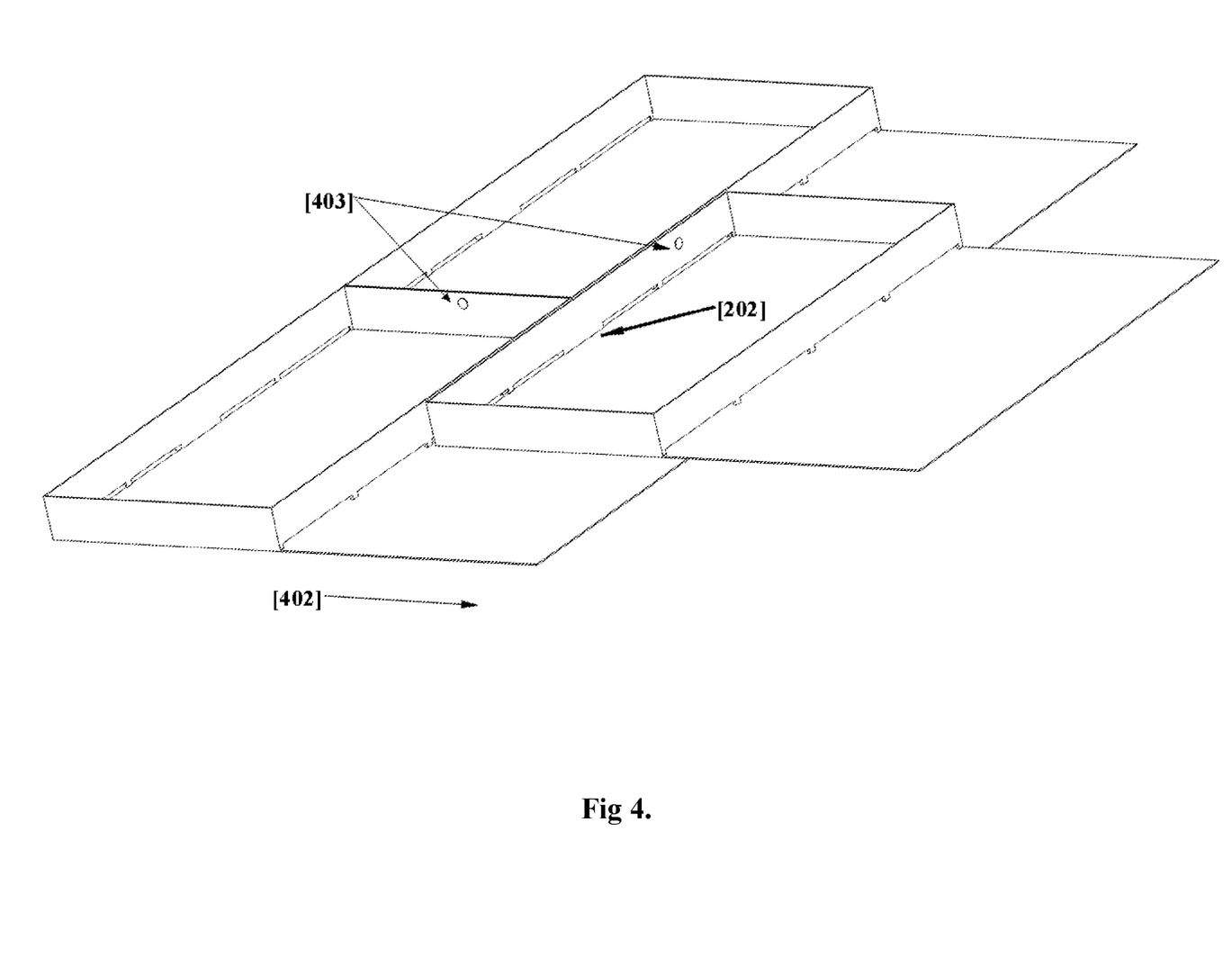
FIG. 4 discloses the configuration of an assembly of green roof shingles on a roof deck showing the alignment of drainage areas as per illustrative embodiments of the invention.

An overview of installed shingles is provided in FIG. 4 and shows the alignment of the occluded area of the lower drainage area (202) with the joint between two adjoined shingles below it with (402) being the direction of the peak of the roof. Also, shown are the potential locations of heads of fasteners such as rivets, screws, etc. (403) that join coincident exposure faces that can be added to mitigate any potential wind uplift of the shingles.

Figure 5:
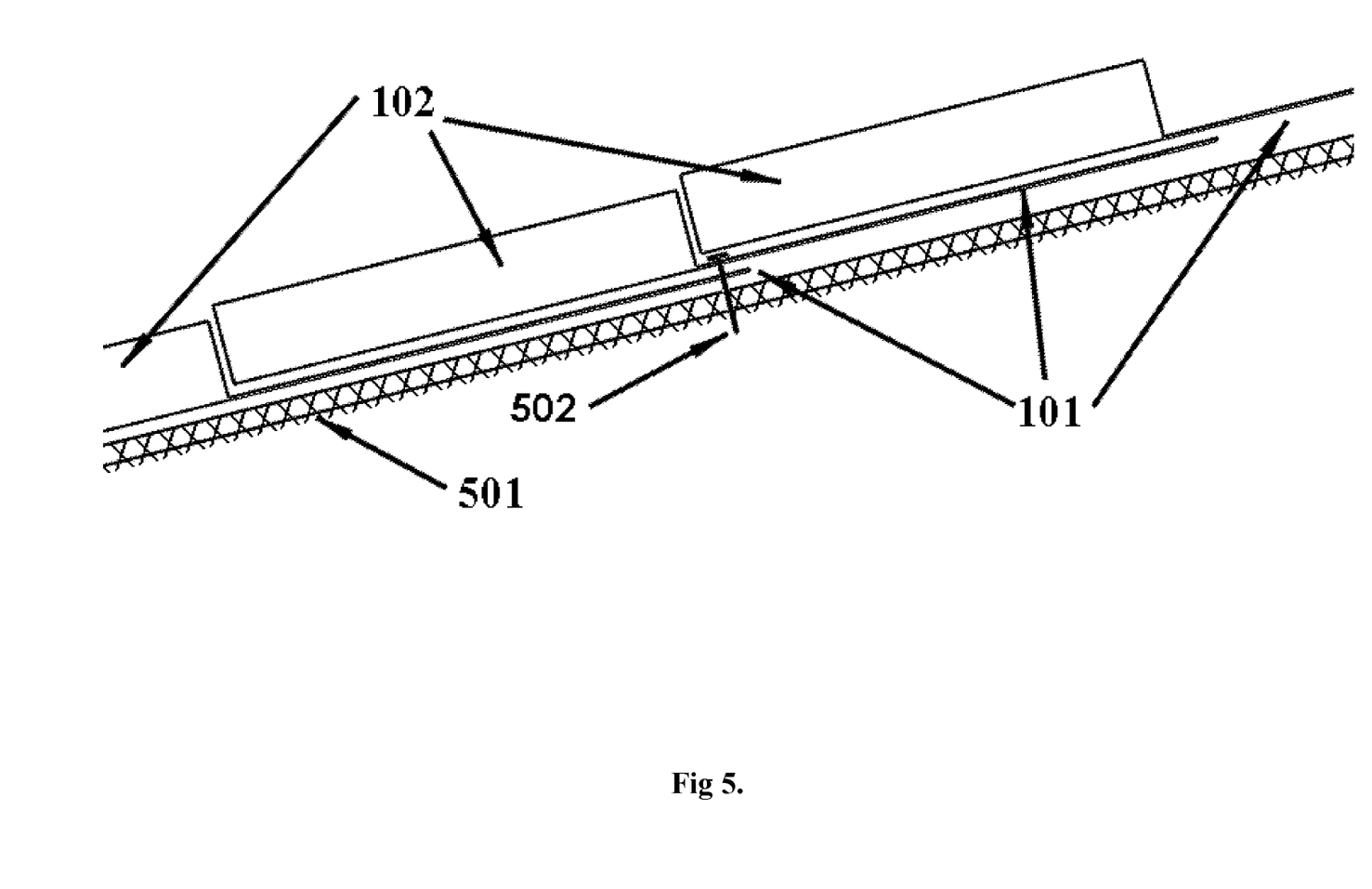
FIG. 5 discloses the configuration of an assembly of green roof shingles on a roof deck as per illustrative embodiments of the invention.

An overview of installed shingles is also provided in FIG. 5 which shows a cross-section of a roofing deck (501) and installed shingles. Water is shed from the bottom of a shingle exposure (102) and into the exposure of the shingle below it. The nail penetrations (502) through the head-lap (101) secure the shingles to the roof deck and are covered by the exposure on the shingle installed above thus preventing water from passing to the roof deck.

Figure 6:
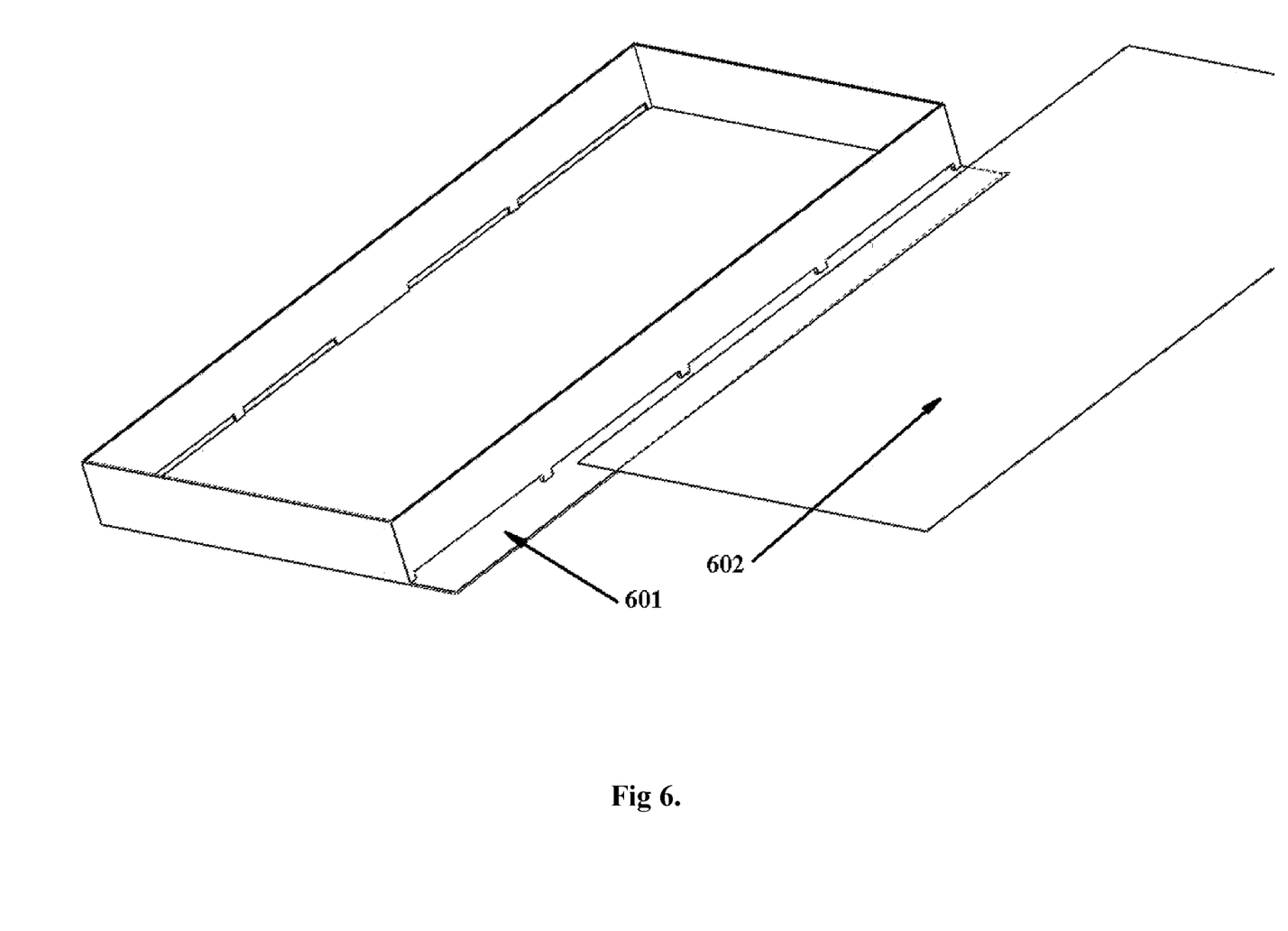
FIG. 6 discloses the configuration of a green roof shingle with short rigid headlap coupled with a flexible membrane headlap as per illustrative embodiments of the invention.

While the exposure requires substantial structural capabilities to support transport, the soil and vegetation and walking on the roof, the headlap doesn't necessary need to be very strong or thick. FIG. 6 shows an alternative configuration of the invention with a short headlap (601) that is approximately the height of the nailing strip and with the bulk of the headlap consisting of a thin waterproof membrane (602). The low part of the membrane can be adhered to the headlap with adhesive. During transport the membrane headlap can be folded over or under the exposure and extended for installation. A membrane headlap will be less costly and result in a less bulky shingle. Alternatively, a membrane headlap can be applied after the shingle is fastened to the roof either on individual shingles or one or more shingles at a time.

One issue with green roof installations is that due to the fact that the support system is not fastened to the roof deck it can be susceptible to wind uplift causing displacement of vegetation. The fact that in this invention the shingles are fastened to the roof should alleviate this problem. For extreme wind events the adjoining faces in an installation can be fastened together periodically with screws, rivets (e.g. 402) or clips to further alleviate this potential issue.

Figure 7:
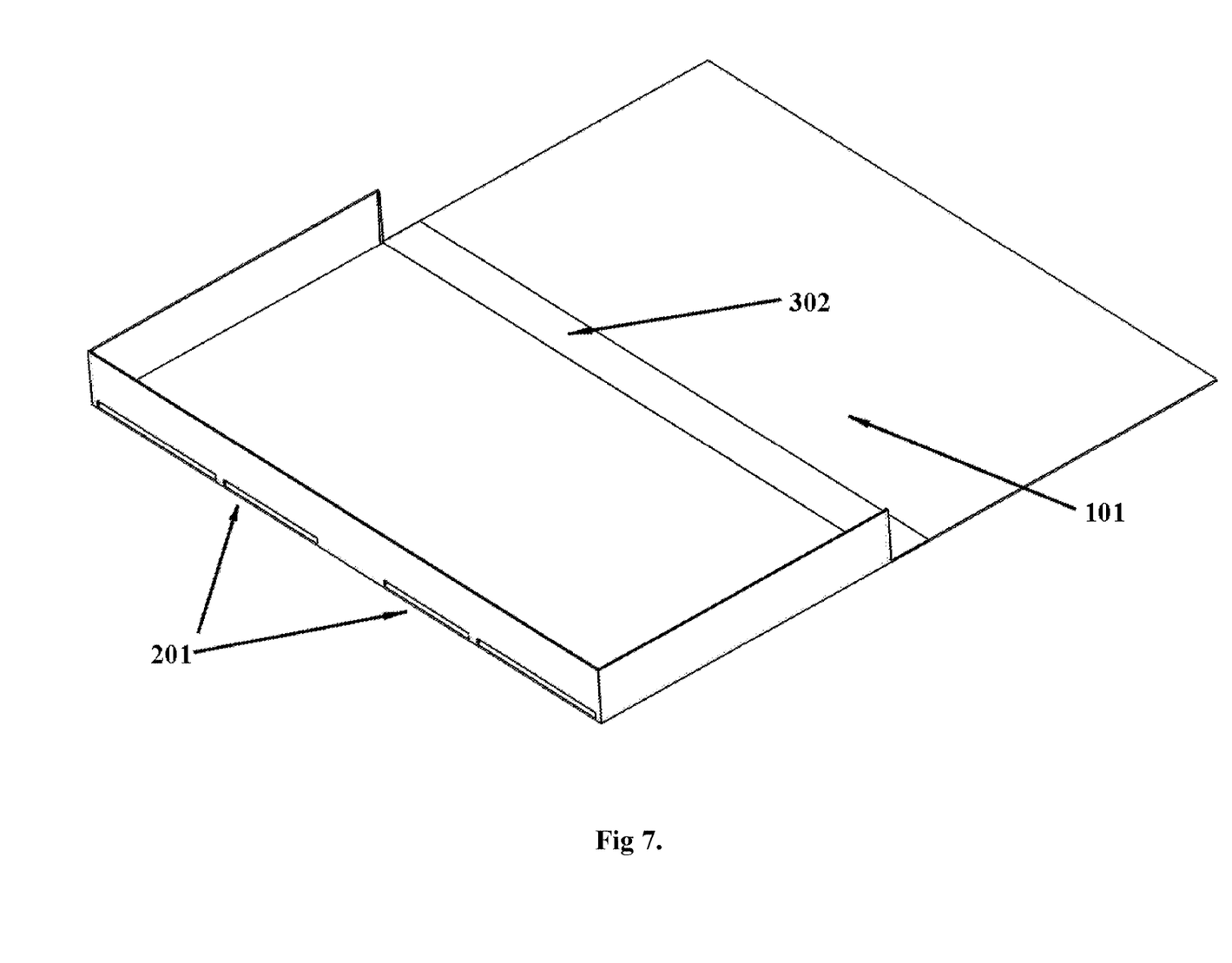
FIG. 7 discloses the configuration green roof shingle without upper border on exposure as per illustrative embodiments of the invention.

Another embodiment of the patent is shown with the shingle in FIG. 7 with only 3 faces to retain the drainage media, soil and vegetation. For situations where the soil and vegetation is added after the shingle is installed the retaining function of the upper face is served by the lower face of the shingle installed above it. This form of the shingle still has the same headlap (101) nailing strip (302) and drainage areas (201) as previous embodiments.

Figure 8:
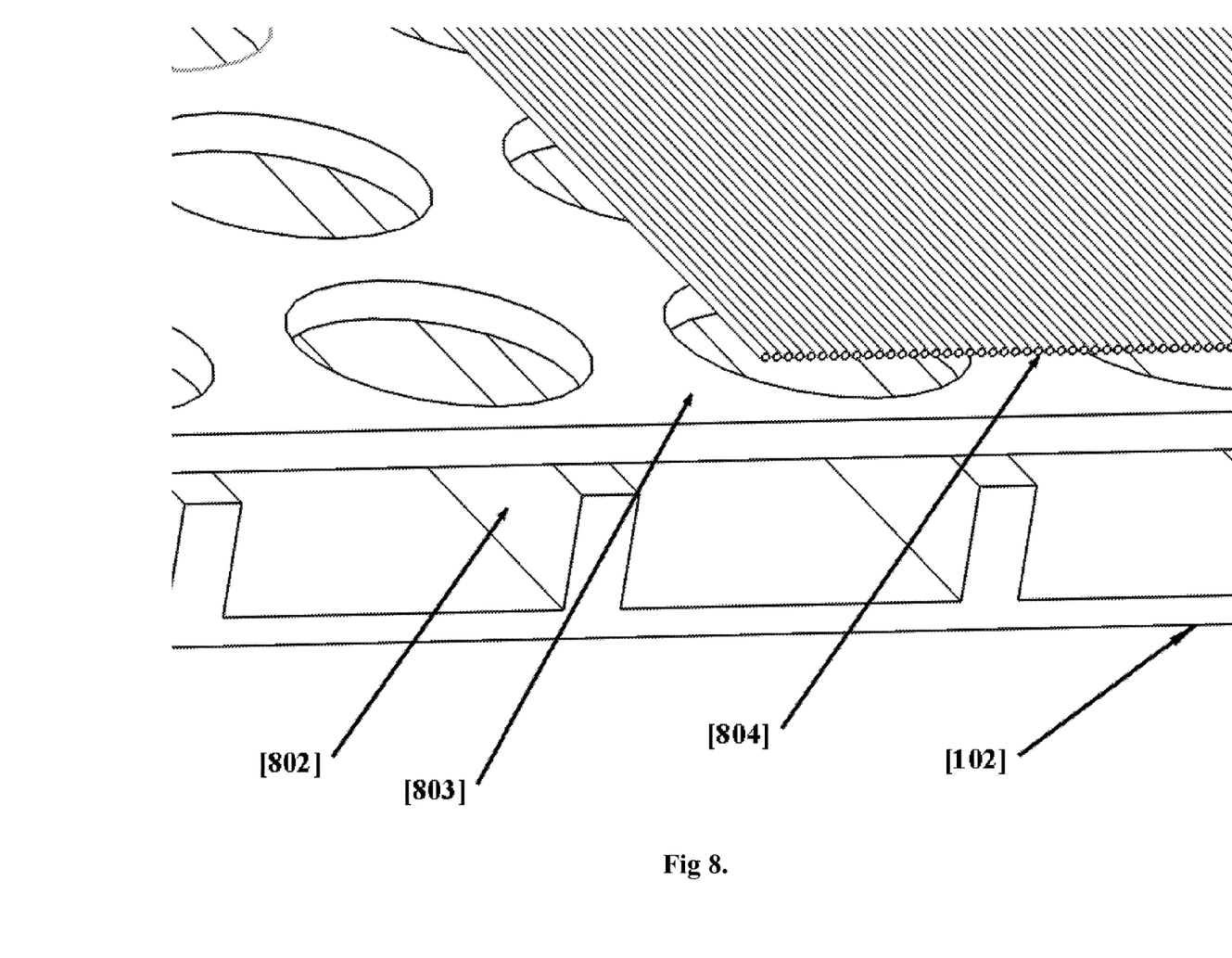
FIG. 8 discloses detail of the drainage area of a green roof shingle per illustrative embodiments of the invention.

The drainage area at the bottom of the exposure can be comprised of mats used in the landscape industry, small rocks or any other media that has a significant amount of air-space to facilitate drainage. FIG. 8 shows an alternative method for providing drainage space with molded supports or protrusions (802) on the bottom face of the exposure (102) that are able to support a rigid perforated plate (803) with a woven or non-woven membrane (804) that will allow water to pass through while preventing the passage of soil.

Figure 9:
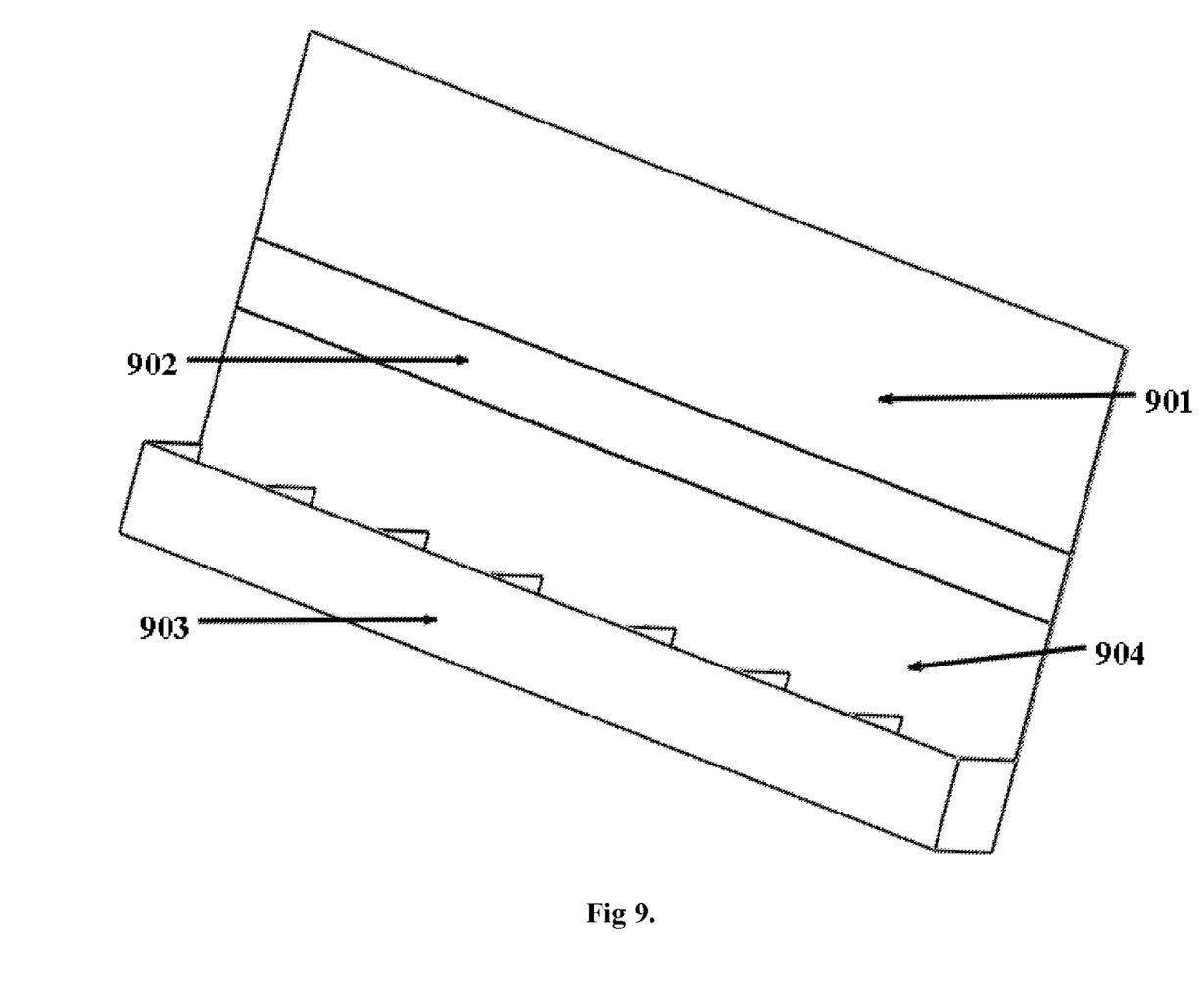
FIG. 9 discloses the configuration of a green siding shingle as per illustrative embodiments of the invention.

Another embodiment of the patent is a green siding shingle (FIG. 9) that supports vegetation and has the normal headlap (901), nailing strip (902) and exposure (904) but is installed on walls or steep roofs. This shingle sheds water with the same mechanism as a roofing shingle however the exposure in this case has a cavity (903) that is open on the top for containing drainage media, soil and vegetation. The cavity can have one or multiple chambers as necessary for structural integrity. The cavity covers less than the entire height of the exposure and leaves area for vegetation to grow. The selected vegetation ideally would grow high enough to obscure the remainder of the exposure that doesn't have the vegetation and soil.

Figure 10:
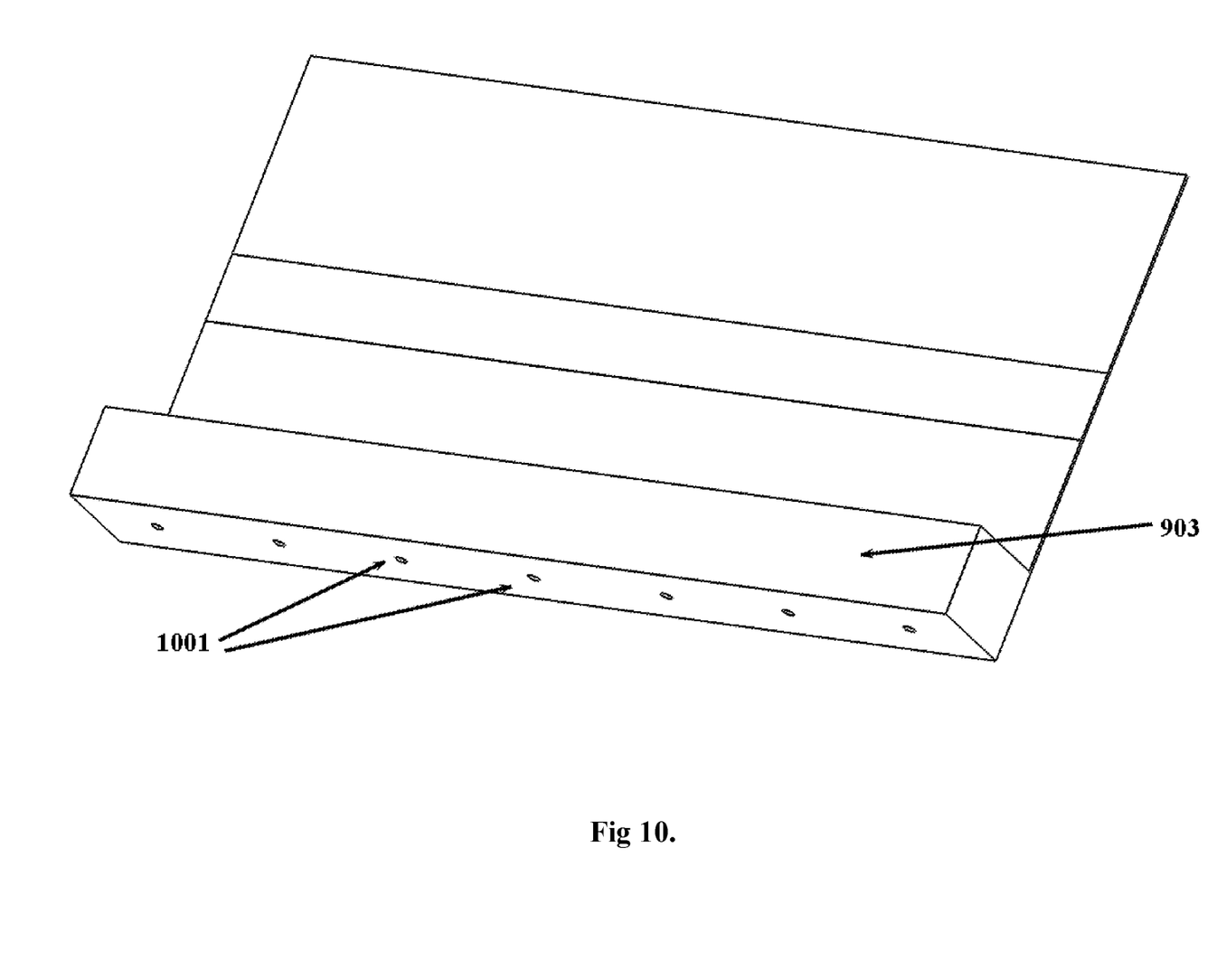
FIG. 10 discloses the configuration of the drainage area of a green siding shingle as per illustrative embodiments of the invention.

FIG. 10 shows the lower face of a green siding shingle with drainage holes (1001). The lower face of the cavity (903) can have any configuration of drainage penetrations such as round or oblong holes, squares, slits, etc. sufficient to retain the drainage media, soil and vegetation and allow water to pass through to the shingle below it.

Similar to the roofing shingle disclosure, the siding shingle can have an occluded area to prevent water from draining between shingles installed below as well as protrusions to prevent lateral water movement.

The ideal material to use to manufacture green roofing shingles is, low-cost, moldable, rigid, lightweight and won't rot. Except for the leading edge of the roof fire resistance is not needed because the shingles are covered in soil which does not burn. Solar UV resistance is not needed except for the shingles around the perimeter of the roof. Initially the edges would be exposed to the sun but over time they would likely be obscured with vegetation. For sun and fire resistance the edges of the shingles can also be covered with paint, cement board, rot-resistant wood, thin sheet metal or other sun or fire resistant material as needed.

Although any moldable material can be used for this invention, probably the best mechanical properties per unit cost would be a natural fiber reinforced thermoplastic composite however the shingles can be molded from a composite of natural or synthetic fibers or fillers (jute, wood, flax, kenaf, cotton, coconut, hemp, bamboo, cellulose, ramie, banana, rice hulls, sawdust, wood flour, wheat straw, coconut pith, bagasse, nut shells, glass, basalt, talc, calcium carbonate, clay, mica, carbon and nanoparticles of these minerals, or mixtures thereof) and thermoplastics (polyolefins, nylon, PVC, polyesters, PLA, styrenics or mixtures thereof, etc.).

The composite formulation can include additives such as pigments (iron and other metal oxides, zinc ferrite, carbon black, titanium dioxide, etc.), UV light stabilizers (HALS, titanium dioxide, carbon black, nickel quenchers, benzophenones, benzotriazoles), antioxidants (hindered phenols, phosphites, thioesters, heat stabilizers; (organophosphites, hindered phenols), fungicides (zinc borate, microban.), coupling agents and polymer compatibilizers and fire retardants (e.g. magnesium hydroxide, alumina trihydrate, borates). If the exposed part of the board is coated or not exposed to light or fire, the UV stabilizers, pigments and fire retardants are not necessary.

For blends of polymers, usually as recycled resins, a suitable coupling agent or compatibilizer such as a silane or maleic acid grafted polymer or suitable block copolymers containing segments that are compatible with the different polymers in the mix. Styrene ethylene butylene styrene triblock copolymer (SEBS) is one compatabilizer that can improve properties of polymer blends.

In some instances fibers or fillers in a thermoset resin with catalyst such as an epoxy or polyester resin may be cost effective. These materials can be made in the form of SMC (sheet molding compound) or BMC (bulk molding compound) and molded. These materials can contain UV stabilizers, pigments, UV stabilizers and antioxidants, as needed.

While specific embodiments have been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The main objective of the invention is to provide a remedy which poses an improved methodology that can be used worldwide for construction of durable and low-cost walls green roofs.

It is further the objective of the invention to provide a methodology which minimizes the labor cost associated with constructing a green roof.

It is also the objective of the invention to provide a design for a roofing shingle that installs like normal roofing shingles while providing a structure for facilitating water drainage and supporting soil and vegetation.

It is also the primary objective of the invention to provide a solution that is ecological by using recycled plastic which has low embedded energy and locally produced natural fibers or agricultural waste.

It is further the objective of the invention to provide a solution which is easy to use and does not require specialized training.

It is moreover the objective of the invention to provide solution which is cost effective to install and has cost effective over the life of the construction.

Thus, it is the objective to provide a new and improved solution for constructing green roofs on sloped surfaces where membranes are typically used. Other aspects, advantages and novel features of the present invention will become apparent from the detailed description of the invention when considered in conjunction with the accompanying drawings.

This Summary is provided merely for purposes of summarizing example embodiments, so as to provide a basic understanding of some aspects of the subject matter described herein. Accordingly, it will be appreciated that the described features are merely examples and should not be construed to narrow the scope or spirit of the subject matter described herein in any way. Other features, aspects, and advantages of the subject matter described herein will become apparent from the following Detailed Description, Figures, and Claims.

The invention claimed is:

1. A shingle with a nailing strip, a head-lap and an exposure wherein;
a height of the head-lap is greater than a height of the exposure;
the exposure consists of a box, the box comprising four sides, a bottom, and opening facing away from the bottom;
the exposure box further comprises the sides enclosing an area, the sides comprising a bottom face, a top face, and side faces, the side faces prevent lateral flow of water;
the exposure box contains vegetation and soil;
a water drainage structure is located in on the bottom of the exposure box;
drainage areas are located in the bottom face of the exposure box; and
drainage areas are located in the top face of the exposure box.

2. The shingle in claim 1 wherein the headlap is comprised of a waterproof membrane.

3. The shingle in claim 1 wherein there are protrusions on the bottom of the exposure box.

4. The shingle in claim 1 wherein the exposure box is about the size of a 250 mm×500 mm×50 mm garden flat.

5. The shingle in claim 2 wherein the headlap is comprised of Polyethylene.

6. The shingle in claim 1 wherein the material of the shingle is comprised of bulk molding compound (BMC).

7. The shingle in claim 1 wherein the material of the shingle is comprised of a natural fiber thermoplastic composite.

8. The shingle in claim 1 wherein the exposure box is comprised of a plurality of small rectangular, circular, hexagonal or square boxes.

9. A siding shingle with a nailing strip, a head-lap and an exposure wherein;
a height of the head-lap is greater than a height of the exposure;
the exposure consists of a box having four sides enclosing an area, and a bottom with an opening facing away from the bottom, one of the sides comprising a bottom face orthogonal to a siding installation;
the exposure box is enclosed on the sides to prevent lateral flow of water;
the exposure box contains vegetation and soil; and
the exposure box contains perforations in the bottom face of the exposure box to allow drainage.

10. The shingle in claim 9 wherein the headlap is comprised of a waterproof membrane.

11. The shingle in claim 9 wherein there are protrusions on the bottom of the exposure box.

12. The shingle in claim 9 wherein the material of construction is comprised of bulk molding compound (BMC).

13. The shingle in claim 9 wherein the material of construction is comprised of a natural fiber thermoplastic composite.

14. The shingle in claim 9 wherein the exposure box is comprised of a plurality of small rectangular, circular, hexagonal or square boxes.

15. The shingle in claim 6 wherein the BMC formulation contains natural fibers.

16. The shingle in claim 12 wherein the BMC formulation contains natural fibers.

* * * * *